March 14, 1961 P. V. LAWRENCE ET AL 2,974,718
INFANT'S CAR SEAT
Filed June 6, 1960
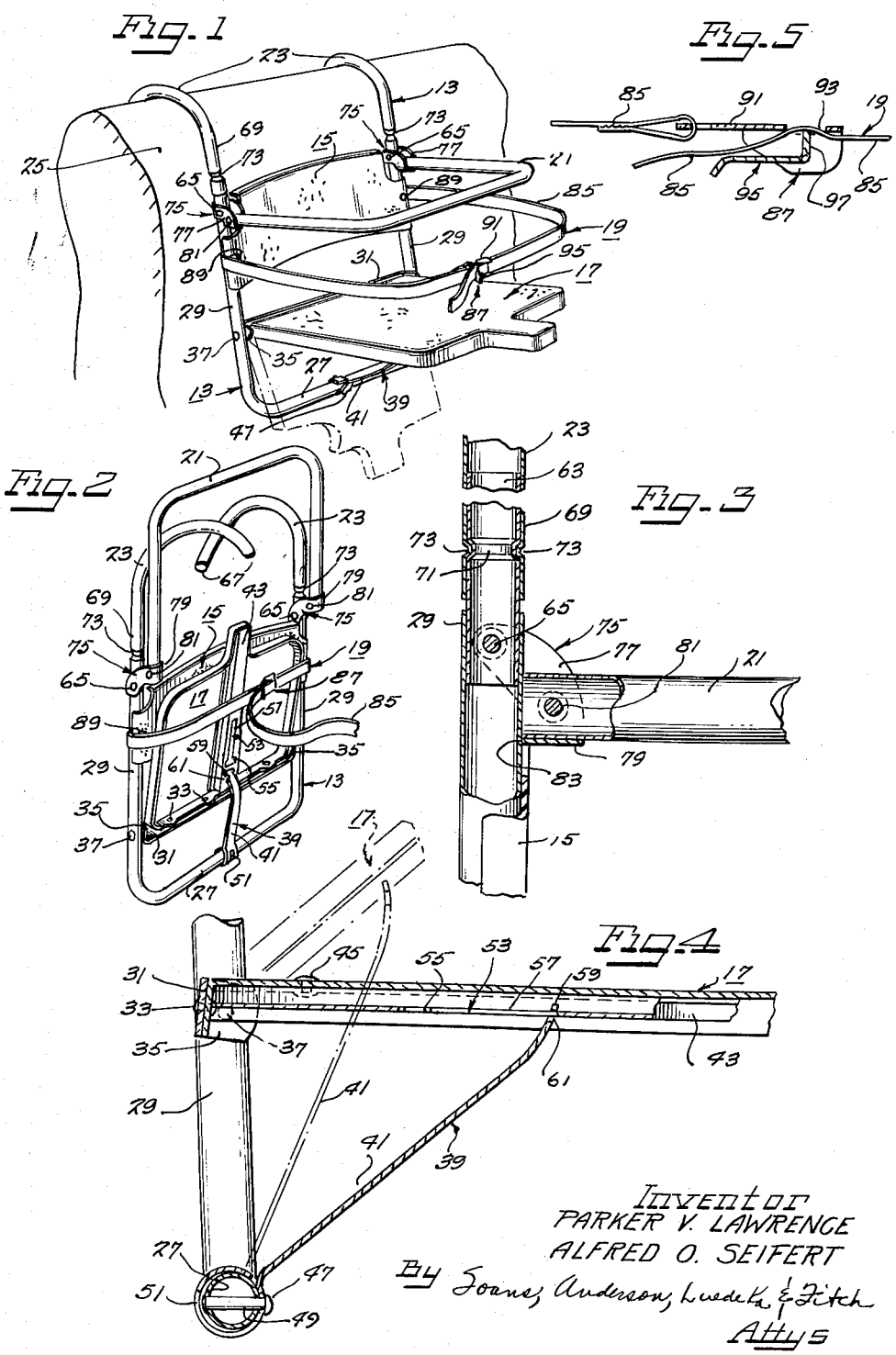
Inventor
PARKER V. LAWRENCE
ALFRED O. SEIFERT
By Jones, Anderson, Luedeka & Fitch
Attys

United States Patent Office 2,974,718
Patented Mar. 14, 1961

2,974,718

INFANT'S CAR SEAT

Parker V. Lawrence, Chicago, Ill., and Alfred O. Seifert, Kenosha, Wis., assignors to Simmons Company, New York, N.Y., a corporation of Delaware Filed June 6, 1960, Ser. No. 34,082

1 Claim. (Cl. 155—11)

This invention relates generally to infant-carrying car seats of the type which is readily hung from the back rest of an automobile seat, and which is adapted to confine a child either in a sitting position or when standing on the seat cushion of the automobile seat.

More particularly, the car seat disclosed herein includes a plurality of related and novel constructional features which facilitate transformation of the car seat from a generally flat storage position to an unfolded condition adapted for hanging on the back rest of a vehicle seat. These constructional features include a novel seat suspension including a safety lock preventing unintended collapse of the seat from its forwardly extending seat forming position, an improved guard rail mounting, and a free swiveling hanger interconnection. In addition, the disclosed car seat also features comfortable seat and back rest elements having improved wearing qualities and an airplane safety belt latch facilitating safe and convenient retention of a child within the car seat.

The invention has for its principal object an improved car seat of the type generally referred to above. Additional more specific objects include the provision of a car seat incorporating one or more of the desirable features enumerated above. A still further object of the invention is the provision of a car seat incorporating various of the enumerated features in an exceptionally clean and attractive design which is also of sturdy construction.

Other objects and advantages will become apparent by reference to the following description and the accompanying drawings in which:

Figure 1 is a perspective view of a car seat which embodies various features of the invention and which is suspended in seat-forming condition from the back rest of a vehicle seat structure;

Figure 2 is a perspective view of the car seat shown in Figure 1, illustrating the car seat in collapsed, storage position;

Figure 3 is an enlarged fragmentary view, partially broken away, illustrating the interconnection of the hangers and guard rail with the frame of the car seat shown in Figure 1;

Figure 4 is an enlarged fragmentary view, partially broken away, illustrating the seat supporting linkage employed in the car seat shown in Figure 1; and Figure 5 is a sectional view of the clamp utilized in connection with the waist strap associated with the car seat shown in Figure 1.

The car seat illustrated in the drawings comprises a frame 13 which carries a back rest 15 and supports a seat 17. Also carried by the frame 13 are a waist strap 19, a guard rail 21 and a pair of swivel hangers 23 adapted to engage the upper surface of the back rest 25 of an automobile seat to suspend the frame 13 along the front surface of the back rest 25. As shown, the frame 13 comprises a length of chrome-plated tubular steel which is formed in a U-shape to provide a cross bar 27 and a pair of spaced, upright parallel legs 29.

The back rest 15 and seat 17 are each molded of resilient plastic material with contoured supporting surfaces having a textured appearance which attractively simulates the appearance of leather and also provides frictional resistance to slipping. The contoured, molded plastic seat and back rest elements will not tear or rip even under abusive conditions and provide comfortable support coupled with a rich appearance. Moreover, the seat and back elements can be repeatedly washed for obvious reasons without affecting their rich appearance.

The seat 17 is pivotally connected to the frame 13 through a cross bracket 31 for upward or downward swinging movement relative to a forwardly extending seat-forming position. When swung to the limiting upward position, the seat 17 is located in adjacent parallel relation to the frame 13 to provide a compact unit for storage. The downwardly hinged position of the seat is normally utilized to permit an infant to stand on the front seat of an automobile while retained by the waist strap 19 within the guard rail 21. The cross bracket 31 is suitably fastened to the rear flange of the seat 17 by a series of rivets 33 and includes, at each end, a bent ear 35 which is pivotally connected to the upright legs 29 of the frame by the rivets 37.

The seat 17 is supported and advantageously locked against collapse from its forwardly extending seat-forming position by means of a linkage 39 which requires substantial upward swinging movement of the seat to disengage the supporting linkage. The particular linkage disclosed includes a link 41 pivotally connected at one end to the cross bar 27 of the frame and detachably engageable at its other end with a channel shaped spinal member 43 which rigidifies the seat and is suitably secured, as by the rivets 45, to the undersurface of the seat. The pivotal connection of the link 41 with the cross bar 27 is provided by curling the lower link end around the cross bar. Movement of the link laterally along the cross bar is prevented by a rivet 47 having a stem 49 which passes through an elongated slot 51 in the lower end of the link and is secured in the cross bar 27. Engagement of the rivet stem 49 with the ends of the slot 51 limits angular travel of the link 41 relative to the frame 13.

Engagement between the spinal member 43 and the link 41 for support of the seat 17 in seat-forming position, or alternatively, disengagement of the link 41 from the spinal member 43 to permit downward positioning of the seat 17, is facilitated by the formation of the link 41 and the spinal member 43. Specifically, the central web of the spinal member 43 includes a keyway or slot 53 having an enlarged entrance 55 adjacent the hinged end of the seat and a narrow passage 57 which constitutes a guideway extending toward the outer end of the seat. The outer end of the link 41, which cooperates with the keyway 53, takes the form of a T-shaped head having a cross bar 59 which is passable through the entrance 55, and a stem 61 which is slidable within the passage 57. Thus, as can be seen in dotted outline in Figure 4, when the seat 17 is disposed upwardly in partially folded condition, the cross bar 59 is insertable through the entrance 55, after which, the seat can be lowered until the stem 61, which has been moving outwardly in the passage 57, engages the outer end of the passage to limit further downward swinging movement of the seat 17, thereby determining its seat-forming position.

In this regard, the outer end of the passage 57 is preferably located so that when engaged by the stem 61, the seat is disposed at an angle of somewhat more than 90 degrees with the upper part of the legs 29, i.e., the part of the legs above the pivot 37. As automobile back rests are usually inclined upwardly and rearwardly, the described disposition of the seat 17 relative to the frame 13 provides a generally horizontal seating surface. Such a level seating surface is particularly desirable for infants as it supports a child without uncomfortable cramping which accompanies elevation of the upper legs and knees when the seat is forwardly and upwardly inclined, and, at the same time, it resists slouching or slumping of the child as will occur when the seat is forwardly and downwardly inclined.

The entrance opening 55 is preferably positioned sufficiently rearwardly in the spinal element to require that the seat 17 be initially raised through about one-half its upward arc to disengage the T-shaped head from the keyway 53, after which, the link 41 and seat 17 are independently swung to a downwardly depending position. This arrangement effectively prevents unintended collapse of the seat while occupied, thereby providing a desirable safety feature.

The car seat as a whole is suspended from the back rest 25 of the automobile seat by the two hangers 23 which are assembled to the upright legs 29 to provide free swiveling action. The particular arrangement disclosed is characterized by its cleanliness of design and, as seen in Figure 3, includes a tubular post or rod 63 which is suitably fixed, as by one of the rivets 65, in the upper end of the upright legs 29 and extends therebeyond for telescopic receipt in the lower end of one of the hangers 23.

Each of the hangers 23 is generally of arcuate form for having engagement over the top of the back rest 25 of the automobile seat and, like the frame 13 and guard rail 21, is fabricated of chrome-plated tubular steel. At their outer ends, the hangers 23 are each suitably capped as at 67 while, at their other ends, each hanger includes a generally straight segment 69 which is telescoped over one of the rods 63 extending from the upright legs 29. Permanent attachment of the posts 63 and hangers 23 is obtained without hindering free swiveling action therebetween by necking in a portion 71 of the post 63 spaced above the ends of the upright legs 29, and by swaging or otherwise forming a mating annular groove 73 in the lower segment 69 of the surrounding hanger 23. Thus, there is provided a neat appearing joint which will not part under loading and which retains the capacity for free swiveling action at all times.

The guard rail 21 is a U-shaped bow which is movable between a folded storage position in offset parallel relation to the frame 13 and a guard position extending forwardly from the frame 13 at about a right angle. Swinging movement between these positions is facilitated by the fixed attachment at each of the guard rail ends of a cradle bracket 75 which, in turn, is pivotally carried on the frame 15 by the rivet 65 fixing the posts 63 in the upright legs 29. Each of the cradle brackets 75 includes a pair of parallel wings 77 which straddle the upright legs 29 and an arch 79 which connects the wings 77 and provides a saddle in which the adjacent end of the guard rail 21 is suitably fixed, as by the rivets 81. More particularly, the edge of the arch, indicated at 83, generally coincides with the adjacent end of the guard rail 21 or extends slightly outwardly therefrom so that engagement of the edge 83 with the associated upright leg 29 limits the downward swinging movement of the rail 21 to the guard position. This construction provides a clean pleasing appearance and is particularly sturdy as the guard rail ends are permanently cradled in the bracket arch and as the loads imposed on the guard rail are carried at each end thereof at two points of interconnection with the frame. If desired, a steering wheel and post can be attached to the cross rail of the guard rail.

While in the car seat, a child can be safely held, either when sitting on the seat 17 or standing on the cushion of the automobile seat, by the waist strap 19 which includes a belt 85 having at one end a clamp 87 resembling, in appearance and operation, the safety belt fasteners commonly employed in airplanes. More particularly, the belt 85 is secured midway of its length by the rivets which fix the back rest 15 on the frame upright legs 29. The clamp 87, in general, comprises a flanged base 91 having a slot 93 therein disposed transversely of the belt direction and a latch member 95 which is pivoted to the flanges of the base and includes an arm 97 swingable inwardly of the slot 93 to clamp the belt between the latch member 95 and the base 91, as shown in Figure 5.

The disclosed car seat combines exceptionally attractive cleanliness of design with improved functional utility. In this regard, the guard rail 21 and waist strap 19 insure secure and reliable retention of an infant within the car seat either when sitting or when standing on the seat cushion of an automobile seat. Moreover, the seat supporting arrangement not only provides adequate support but effectively prevents unexpected and unwanted collapse of the seat from its sitting position. In addition, the foldability of the seat 17, guard rail 21, hangers 23, and link 41 into a compact flat unit facilitates storage of the car seat in a minimum of space.

Various features of the invention are set forth in the appended claim.

What is claimed is:

A car seat for infants which is foldable to a generally flat storage position and which permits confinement of a child in either a seated or standing position, said car seat comprising a frame adapted to rest against the upwardly and rearwardly inclined front surface of the back rest of a vehicle seat, said frame being generally of U-shape and including a pair of laterally spaced apart generally upright legs and a cross bar interconnecting the lower ends of said upright legs, a pair of hangers adapted for engagement over the top surface of the back rest of the vehicle seat to support said car seat, means for interconnecting said hangers to the upper ends of said upright legs for free swiveling of said hangers relative to said frame between a vehicle seat engaging position and a storage position generally parallel with said frame, and, at the same time, for preventing disconnection of said hangers from said upright legs, each of said interconnecting means comprising a post projecting from either one of said hanger and said upright leg, and a portion of the other of said hanger and said upright leg in telescopic engagement with said post, said posts and said telescopically engaged portions each having interfitting projections preventing axial displacement of said portions relative to said posts without interfering with the free swiveling of said hangers relative to said frame, a seat hingedly carried by said frame above said cross bar for swinging movement upwardly and downwardly relative to a forwardly extending, generally horizontal seat forming position, a rigid link interconnecting said seat and said cross bar to support said seat in the seat forming position, said seat having on its undersurface a forwardly extending support with a guideway therein having an entrance adjacent its rearward end, said link having at one end a pivotal collection with said cross bar and having its other end passable through said entrance and into slidably engagement with said guideway, whereby said seat is supported in seat forming position when the other end of said link is in abutting engagement with the forward end of said guideway, and said link being disengageable from said guideway to permit independent disposition of said seat and said link in a storage position disposed in generally parallel relation to the front surface of the vehicle seat when said seat is swung upwardly to permit outward passage of the other end of said link from said guideway through said entrance, a U-shaped guard rail swingable between a forwardly extending position relative to said frame in spaced above relation to said seat and a storage position in general parallelism to said frame, and cradle brackets pivotally interconnecting said upright legs with the ends of said guard rail, each of said brackets having one portion in fixed supporting engagement with the undersurface of an end part of said guard rail and a pair of arms extending from said one portion in straddling relation to said guard rail end part to a pivotal interconnection with one of said legs, said one portion of said brackets having an edge which engages the adjacent upright leg to determine the angular relation of said guard rail to said frame when said guard rail is in the forwardly extending position.

References Cited in the file of this patent

UNITED STATES PATENTS

| | | |
|---|---|---|
| 1,371,715 | West | Mar. 15, 1921 |
| 2,822,117 | Mack | Feb. 4, 1958 |
| 2,888,061 | Berlin | May 26, 1959 |